Aug. 27, 1963  C. V. BULLEN  3,102,217
MECHANICALLY REBALANCED CONDITION CONTROL SERVOSYSTEM
Filed Feb. 1, 1960
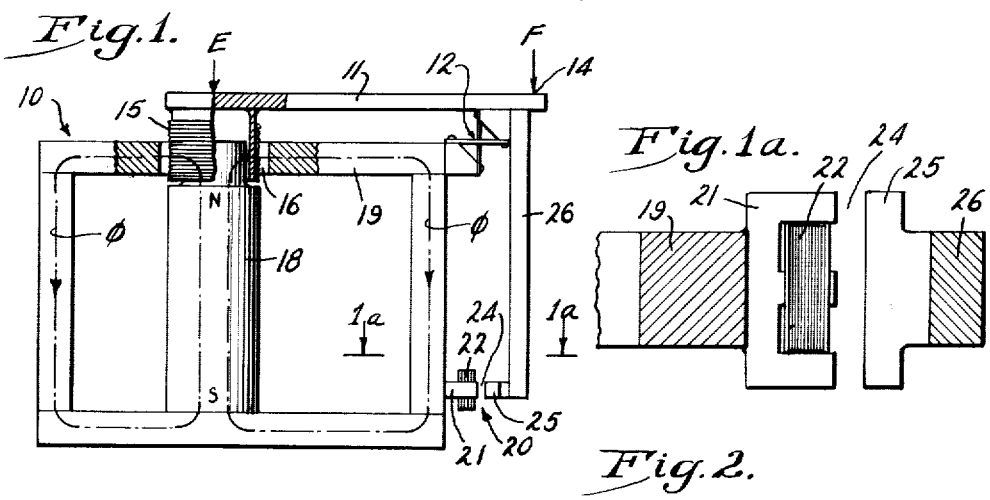
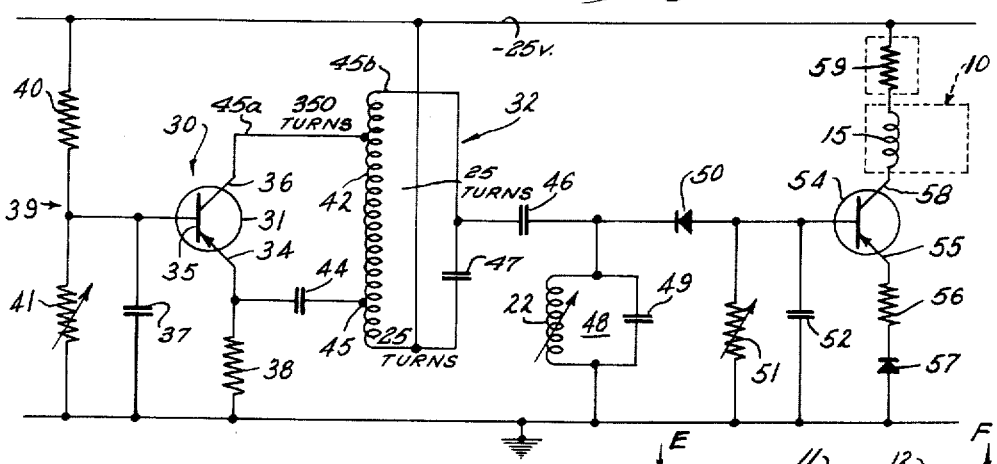
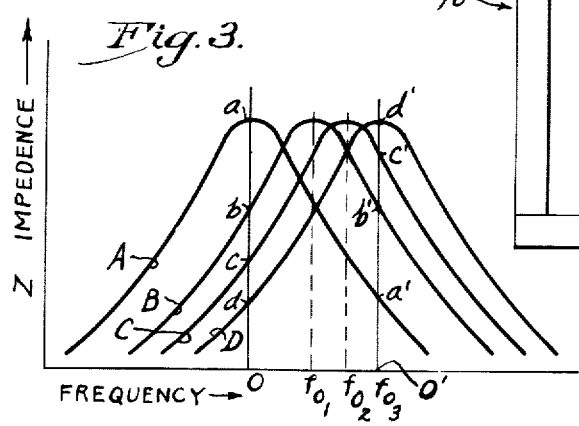
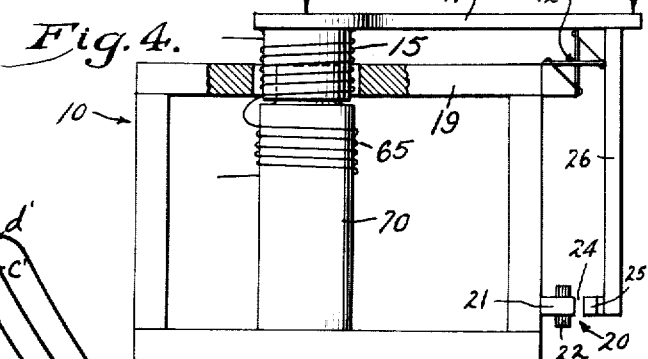
INVENTOR.
Clark V. Bullen
BY Wolfe, Hubbard, Voit & Osann
ATTORNEYS

United States Patent Office 3,102,217
Patented Aug. 27, 1963

3,102,217
MECHANICALLY REBALANCED CONDITION
CONTROL SERVOSYSTEM
Clark V. Bullen, Rockford, Ill., assignor to Barber-Coleman Company, Rockford, Ill., a corporation of Illinois
Filed Feb. 1, 1960, Ser. No. 5,889
6 Claims. (Cl. 318—28)

The present invention relates in general to systems for automatically controlling variable conditions such as temperature, pressure, fluid flow, liquid level, and the like. More particularly, the invention has to do with a transducer for producing a D.-C. signal which in magnitude varies as the variable condition and which is susceptible of transmission to a remotely disposed recorder or controller.

It is the general aim of the invention to provide a condition-to-current transducer of the type indicated and characterized by enhanced reliability and immunity to changing ambient conditions.

In a more specific sense, it is an object of the invention to provide such a transducer which employs an oscillator, but in which the "loading" or D.-C. current flow through the oscillator is not appreciably varied as the sensed condition changes over a wide range. This makes it possible to obtain stable operation of the oscillator and thus the whole transducer over a wider range of ambient temperature changes.

Another object of the invention is to provide a transducer of the type stated in which an alternating voltage, varying in amplitude with the position of a balance lever, is converted into a correspondingly varying D.-C. signal in a manner such that the alternating voltage circuits are not appreciably loaded by direct current flow.

It is a related object to create in such a transducer an A.-C. signal, which is variable in amplitude with a changing condition, by modifying the output of an oscillator without appreciably changing the tuning or loading on the oscillator.

Still another object is to provide such a transducer which requires but a relatively small number of standard electrical components, and which is susceptible of both economical manufacture and convenient servicing.

Other objects and advantages will become apparent as the following description proceeds, taken in conjunction with the accompanying drawings, in which:

FIGURE 1 is an elevation of an exemplary force-balance;

FIG. 1a is a detail view taken in section substantially along the line 1a—1a in FIG. 1, and showing a pick-up coil assembly;

FIG. 2 is a schematic wiring diagram of the apparatus employed to energize an electromagnetic force coil and a load;

FIG. 3 is a graph showing the relative variation of impedance with frequency for a parallel resonant L-C circuit as the latter is tuned to several different resonant frequencies; and FIG. 4 illustrates an alternative construction of the force-balance of FIGURE 1 for use where the input condition-responsive force varies as the square of the condition controlled.

While the invention has been shown and will be described in some detail with reference to particular embodiments thereof, there is no intention that it be limited to such detail. On the contrary, it is intended here to cover all modifications, alternatives and equivalents falling within the spirit and scope of the invention as defined by the appended claims.

Referring to FIG. 1, the force-balance 10 there shown includes a lever 11 fulcrumed at 12 and adapted to receive two forces which produce opposite, balancing moments. The first such force F is applied, for example, to a point 14 on the right side of the fulcrum 12, while a counteracting force E is applied to the left end of the lever 11 by an electromagnetic balancing coil 15 to be described more fully below.

The force F varies as some predetermined function of the value of a changeable condition such as temperature, fluid flow, liquid level, or the like. Various forms of apparatus for producing the force F are well known to those skilled in the art and need not be described in detail.

The balancing coil 15 is excited with a D.-C. current in a manner which will be more fully explained. For the present, it is sufficient to observe that the coil 15 is disposed in an air gap 16 defined between a permanent magnet 18 and a permeable frame 19. As here shown, the permanent magnet 18 is cylindrical, and the gap 16 is annular, so that there is a uniform distribution of flux $\phi$ in the gap. Current flow through coil 15 produces the downward force E on the left end of the lever 11, tending to draw the coil into a centered position within the gap 16.

So long as the force F and the force E balance one another the lever 11 will remain stationary. An increase or decrease in the force F will cause the lever 11 to rock clockwise or counterclockwise about the pivot 12.

In order to detect such changes in the position of the lever 11 and to effect a change in the current supplied to the coil 15 so as to balance any change in the force F, provision is first made to change the tuning of the parallel resonant circuit according to movements of the lever. For this purpose, a pick-up coil assembly 20 is associated with the force-balance and an inductance therein is changed in value according to the position of the lever 11.

More particularly as shown in FIGS. 1 and 1a, an E-shaped core 21 is attached to the frame 19 with a pick-up coil 22 wound on its middle leg. Separated from the core 21 by an air gap 24 and facing the E-shaped core 21 is a bar 25 attached to a member 26 depending from the lever 11. As the condition-responsive force F varies, the bar 25 is moved relative to the core 21 and the width of the gap 24 is changed. This correspondingly changes the inductance of the coil 22. As will be explained later, the variation in inductance of the coil 22 is caused to alter the electromagnetic force E to counterbalance the condition-responsive force F.

In accordance with the present invention, the changes in the inductance of the coil 22 are caused by varying the tuning of the resonant circuit to which is applied a relatively high frequency A.-C. voltage. The variations in the tuning and impedance of this parallel resonant circuit produce corresponding variations in the amplitude of an A.-C. signal, and this is converted into a correspondingly varying D.-C. current which is passed through the coil 15.

In the preferred form shown by FIG. 2, the apparatus for accomplishing these functions includes a source of relatively high frequency A.-C. signals. For this purpose, a simple and rugged oscillator 30 is employed. The oscillator 30 is formed in the present instance by a transistor 31 interconnected with an L-C tank circuit 32 and is known in the art as a grounded base Hartley oscillator. As here shown, the transistor is of the PNP type, having an emitter 34, a base 35 and a collector 36. The collector is connected to one side of the L-C tank circuit 32, the other side of the tank circuit being connected to a suitable D.-C. voltage source here represented by the —25 v. terminal. To make the transistor self-biasing, a resistance 38 is connected between the emitter 34 and the positive or ground terminal of the voltage source.

To render the oscillator substantially immune to wide changes in ambient temperatures, its biasing circuit 39 employs a temperature-sensitive resistor 41. A voltage which correctively varies with temperature is supplied to the base 35 by connecting the latter to the junction of a fixed resistance 40 and a temperature sensitive-resistance 41 which are in series between the −25 v. source and ground terminals. The resistor 41 has a negative temperature coefficient, i.e., the value increases with decreasing temperature. Thus D.-C. forward bias voltage applied to the emitter-base junction of the transistor will increase or decrease as the ambient temperature respectively decreases or increases. Variation of this voltage maintains substantially constant the D.-C. bias current flowing through the emitter and base of the transistor 31 regardless of changes in the transistor characteristics with temperature changes. The effect is to stabilize the control point as the ambient temperature increases or decreases and thus to keep the transistor biased for A.-C. conduction in the collector circuit regardless of changes in temperature. Stable operation of the oscillator has been obtained over a temperature range of −20° F. to +150° F.

Positive feedback to sustain alternating oscillations in the tank circuit 32 is achieved by feeding back a portion of the voltage across the tank circuit inductance 42 so as to produce regenerative A.-C. signal currents in the emitter circuit of the transistor 31. This is done by a capacitor 44 connected from a tap 45 on the inductance 42 to the emitter 34, the phasing of the feedback voltage being such that the latter causes current flow in the collector circuit which sustains the oscillations.

The output of the oscillator 30 is applied through a coupling capacitor 46 to a variably tuned parallel resonant L-C circuit 48 made up of the pick-up coil 22 and a capacitor 49 connected in parallel therewith. The resonant frequency of the circuit 48 will vary relative to the oscillator frequency as the value of the inductive element 22 changes. This is illustrated in FIG. 3 wherein the four curves A, B, C and D represent the impedance versus frequency characteristics of the circuit 48 as the coil 22 takes on four progressively smaller values of inductance. The result is that at the oscillator frequency, represented by the line O in FIG. 3, the impedance of the circuit 48 will progressively decrease through the values $a$, $b$, $c$ and $d$ as the inductance of the coil 22 is progressively decreased.

The relationship between the impedance of the circuit 48 and the position of the lever 11 may be understood by observing that inductance of a coil varies inversely with reluctance of the magnetic circuit or flux path associated with the coil. Since air has a higher reluctance than iron or permeable core material, if the air gap 24 is made larger, the inductance of the coil 22 will become smaller. Thus as the air gap 24 tends to increase, due to the input force F decreasing, the inductance of the coil 22 decreases and vice versa. The graphs of FIG. 3 show by points $a$, $b$, $c$ and $d$ that as the inductance of the coil 22 takes on four progressively smaller values, the resonant frequency of the circuit 48 changes from O to $fo_1$ to $fo_2$ to $fo_3$. At a given oscillator frequency O, therefore, the impedance of the circuit 48 decreases from point $a$ to points $b$ to $c$ to $d$ as the lever 11 rocks slightly counterclockwise (FIG. 1) and the coil 22 takes on progressively smaller values of inductance.

The tank circuit 32, the coupling capacitor 46, and the parallel circuit 48 form, in effect, a voltage divider energized by the high frequency A.-C. output of the oscillator 30. Thus, as the inductance of the coil 22 increases or decreases, and the impedance of the circuit 48 increases or decreases, the amplitude of the A.-C. voltage appearing across the circuit 48 will correspondingly increase or decrease. The oscillator 30 and the variably tuned circuit 48 therefore cooperate to produce across the latter an A.-C. signal which in amplitude varies as the position of the lever 11 changes.

To produce a D.-C. output signal which varies as the force F, and also correctively to change the excitation of the coil 15 so as to keep the lever 11 balanced, the A.-C. voltage appearing across the circuit 48 is rectified, smoothed, and amplified. As here shown, a diode 50 is connected across the circuit 48 through a resistor 51, the latter being paralleled with a smoothing capacitor 52. The emitter-base junction of an amplifying transistor 54 is connected across the resistor 51, so that the D.-C. signal current flowing through that junction will vary as the amplitude of the A.-C. voltage appearing across the circuit 48.

The amplifying transistor 54 has its emitter 55 connected through a resistor 56 and a diode 57 to ground, while its collector 58 is connected through the coil 15 and a load device 59 (such as the input of a recorder or controller) to the −25 v. terminal. The D.-C. current flowing through the balancing coil 15 and the load 59 is thus related directly to the impedance of the circuit 48 and the amplitude of the A.-C. voltage appearing across the latter.

The function of the diode 57 is to create a reverse biasing voltage on the emitter-base junction if there should be collector current flow, even in the absence of an input signal, at very high ambient temperatures. The problem of increased collector current ($I_{co}$) with no input voltage exists at high ambient temperatures because of the increased activity of the charge carriers within the transistor. At normal room temperatures, with zero input signal, the collector current amounts to only a few microamperes. However, as the ambient temperature increases, the collector leakage current increases. Since this leakage current traverses the emitter-base junction in the forward direction it is amplified by the current amplification factor of the transistor, causing a still greater collector current. At elevated temperatures the base signal is thus unable to control the collector current over the lower ranges. The characteristic of diode 57 that makes it useful here is that its forward voltage drop remains relatively constant even at very low values of current. This forward voltage drop, in the neighborhood of 0.5 volt is applied as a reverse bias to the emitter-base junction and tends to prevent the collector current from rising appreciably at the higher ambient temperatures with zero or small input signals.

The inductance of pick-up coil 22 determines the electromagnetic force E exerted by the balancing coil 15. The parallel resonant circuit 48, of which the coil 22 is the inductive element, is so adjusted that it is resonant at the oscillator frequency when the lever 11 is at its clockwise limit and the air gap 24 is fully closed. This provides the maximum inductance for the coil 22 and produces the impedance vs. frequency characteristic represented by curve A in FIG. 3. This means that as the input force F increases and tends to overcome the force E, the gap 24 will close. The more nearly closed the gap 24 becomes, the greater will be the excitation current supplied to the balance coil 15, so that the input force F will be balanced. For each value of the input force F, therefore, the lever 11 will come to balance at a different position, the gap 24 being narrower when the force F is greater. The total range of motion need not be great, however; in an embodiment like that shown in FIGS. 1 and 2 the balance coil 15 moves only about .003 inch as the input force changes from zero to about twenty-six grams and the balance excitation current varies from zero to about twenty milliamperes. The value of the output current besides being dependent upon input force is also dependent upon the number of turns on the coil 15 and the strength of the magnetic field in the air gap 16. By proper design the strength of the magnetic field can be made to remain constant with time and with ambient temperature changes, and to be uniform throughout the operative range of movement of the balancing coil 15. Therefore, as long as the coil 15 resides within this operative range, the counterbalancing force it develops will be independent of variations of such usual circuit factors as temperature, load resistance, and line voltage. The electromagnetic counterbalancing force created by the coil 15 will be a function only of the output current flowing through the coil, and this output current will be a function only of the input force F.

Alternatively, the circuit 48 can be so adjusted that when the air gap 24 is at its maximum width, the circuit is resonant at some different frequency of the oscillator 30. The forces F and E would be supplied in the opposite direction from those shown in FIG. 1. With the oscillator having the different frequency O' (FIG. 3), the characteristics of the circuit 48 would change from curve A to B to C to D as the input force increases, thus increasing the impedance from $a'$ through $d'$. Thus, the excitation current applied to the balance coil 15 would vary as the input force F.

The operation of the system may now be summarized for a better understanding. Assume that the system is in a state of balance with the bar 25 in some intermediate position with respect to the core 21 and coil 22. The parallel resonant circuit 48 will present a certain impedance to the A.-C. output of the oscillator 30, and a corresponding A.-C. voltage across the circuit 48 will be rectified by the diode 50, the rectified signal from the diode 50 is amplified by the transistor 54 and a D.-C. current supplied to the balance coil 15. The latter produces the electromagnetic force E to exactly counterbalance the applied force F. At this balance point the oscillator frequency is some value O as shown in FIG. 3, and the impedance of the circuit 48 may be assumed to have a value corresponding to the point $c$.

If now the force F increases, the bar 25 will move slightly closer to the core 21 and thus decrease the air gap 24. The decrease in length of the air gap 24 will increase the inductance of the coil 22, which will change the impedance of the circuit 48 from the value at point $c$ to a new value corresponding to point $b$. This increased impedance will result in a larger portion of the oscillator output voltage being transferred to the rectifier 50, and thus a greater D.-C. current to flow through the coil 15. The effect will be to increase the electromagnetic force E about the pivot 12 and thus counterbalance the increased applied force F. Of course, the corrective action to change the D.-C. excitation of the coil 15 when the force F changes occurs very rapidly, and there is only a very slight movement at the lever 11. In response to a decrease in the input force F, the opposite action occurs, and the excitation current is correspondingly decreased.

It will be understood that the current which flows through the balance coil 15 also flows through the load device 59, since the two are connected in series. The load device 59 may be, for example, the current-responsive input of an indicating meter, a recorder, or a controller. Since a certain current must pass through the balance coil 15 to balance a given input force F, the current in the load device 59 will always depend strictly on the input force F and will generally be independent of variations in the length of the wires leading to the load device or changes in the resistance of the load device. The present system is useful, not only as a transducer for producing a current which varies with or is proportional to an input force, but also as a transducer which will permit that current to be transmitted over relatively great distances to remotely located utilization devices.

There are several important advantages afforded by tranducers of the type described above. First, it will be apparent that there is no appreciable D.-C. loading on the oscillator circuit 30. More specifically, the D.-C. component of current in the oscillator transistor does not change appreciably as the output current passed through the load 59 varies over a wide range. This facilitates stable, reliable operation of the oscillator with a minimum of adjustments. Secondly, the effects of ambient temperature changes, aging of the transistors, and drifting of the oscillator frequency all are compensated for and cancelled out by the balancing action of lever 11. For continued reliable operation it is only necessary that the oscillator 30 continue to oscillate at some frequency, not necessarily at exactly the same frequency. To maintain oscillations in the face of ambient temperature changes, a temperature compensating resistor 41 is used to keep the transistor biased in its conductive region.

The oscillator 30, indeed, serves only as a source of relatively high frequency A.-C. voltage, the frequency and amplitude of which are not particularly critical. The high frequency is necessary in order that a relatively wide variation in the impedance of the circuit 48 is obtained despite the fact that the coil 22 is small and the gap 24 does not vary greatly in width on account of the motion of the lever 11 being limited. Although the particular frequency chosen for the oscillator may be any within a wide range, the oscillator 30 in one successful physical embodiment has been constructed to operate at about 75 kc. Exemplary values of circuit parameters for operation at an oscillator frequency of 75 kc. are as follows: transistor 30 is a 2N1127; capacitance 37 is .0047 mfd.; resistance 38 is 330 ohms; resistance 40 is 22000 ohms; resistance 41 is 4700 ohms; inductance 42 is 6.4 millihenries with the following windings: 25 turns between terminal 45 and the —25 v. terminal, 25 turns between terminals 45 and 45$a$ and 350 turns between terminals 45$a$ and 45$b$; capacitor 44 is .05 mfd.; capacitor 46 is .00025 mfd.; capacitor 47 is .0007 mfd.; inductance 22 is about .56 millihenry and capacitor 49 is .008 mfd.

FIG. 4 shows an alternate construction of the force-balance 10 of FIG. 1 for use where the output current is to be proportioned to the square root of the applied force. An example of this type of situation would be where the current is to control a fluid flow actuator and the applied force F is directly proportional to a differential pressure taken across an orifice. In some applications such differential pressure is proportional to the square of the flow rate. In these situations the output current must vary as the square root of the applied differential pressure, i.e., the applied force.

In this second embodiment (FIG. 4), the balance coil 15 is connected in series with the second coil 65 wound on a soft iron core 70 which replaces the permanent magnet 18 shown in FIG. 1. It is apparent that the same current will flow through both coils 15 and 65. Therefore, the electromagnetic force E, which is proportional to the product of the current in the balance coil 15 and the flux produced by the same current in the second coil 65, will itself be proportional to the square of the excitation or output current. In all other respects, the embodiment of FIG. 4 is like that described in connection with FIGS. 1–3.

Following through a typical operation cycle of this second embodiment, assume the force balance 10 is in a balanced position. If the applied force F (being proportional, for example, to a differential pressure) increases, the width of the air gap 24 will be decreased and the impedance of the coil 22 will increase from point $c$ to point $b$ (FIG. 3). This will result in a larger A.-C. voltage being applied to the rectifier 50 and resistor 51, so that the current flowing through the two coils 15 and 65 will be increased. This of course, will increase the counterbalancing electromagnetic force E resulting from the coaction of the voice coil 15 current and the core 65 flux. It is clear that the electromagnetic balancing force E in this second embodiment will be proportional to the square of the excitation or output current. Thus the load current will not vary directly with the applied force F, but as a different predetermined function, specifically as the square root, of that force.

I claim as my invention:

1. A force-to-current transducer comprising, in combination, a fulcrumed lever balanced by application thereto of a condition-responsive input force and an electromagnetic counterforce, an electromagnetic means coupled with said lever and energized by a D.-C. excitation current for producing said counterforce, means for producing said excitation current including, a source of relatively high frequency A.-C. voltage, inductive and capacitive elements connected in parallel and connected to be energized by said source, means coupled to said lever for varying the reactance of one of said elements in response to movement of said lever so that the resonant frequency of said parallel-connected elements is varied relative to the frequency of said source, and means responsive to the amplitude of the A.-C. voltage across said parallel-connected elements to produce said D.-C. excitation current.

2. A force-to-current transducer comprising, in combination, a fulcrumed lever balanced by application thereto of a condition-responsive input force and an electromagnetic counterforce, an electromagnetic means coupled with said lever and energized by a D.-C. excitation current for producing said counterforce, means for producing said excitation current including, an oscillator, inductive and capacitive elements connected in parallel and connected to be energized by said oscillator, means coupled to said lever for varying the reactance of one of said elements in response to movement of said lever so that the resonant frequency of said parallel-connected elements is varied relative to the frequency of said oscillator, means coupled to said parallel-connected elements for producing a rectified signal varying in magnitude as the amplitude of the A.-C. signal appearing across said elements, and amplifier means responsive to said D.-C. signal for producing said D.-C. excitation current.

3. A force-to-current transducer comprising, in combination, a fulcrumed lever balanced by application thereto of a condition-responsive input force and an electromagnetic counterforce, an electromagnetic means coupled with said lever and energized by a D.-C. excitation current for producing said counterforce, means for producing said excitation current including, an oscillator having output terminals, inductive and capacitive elements connected in parallel and across said output terminals, means for varying the inductance of said inductive element in response to movement of said lever so that an increase in inductance will decrease resonant frequency of said parallel-connected elements relative to the frequency of said oscillator, means coupled to said parallel-connected elements for producing a D.-C. signal varying in magnitude as the amplitude of the A.-C. signal appearing across said elements, and amplifier means responsive to said D.-C. signal for producing said D.-C. excitation current.

4. A force-to-current transducer comprising, in combination, a fulcrumed lever balanced by application thereto of a condition-responsive input force and an electromagnetic counterforce, an electromagnetic means coupled with said lever and energized by a D.-C. excitation current for producing said counterforce, means for producing said excitation current including, a transistor oscillator operating at a relatively high frequency, inductive and capacitive elements connected in parallel and energized by said oscillator, means for varying the inductance of said inductive element in response to movement of said lever so that the impedance of said parallel-connected elements is dependent upon the position of said lever, rectifier means coupled to said elements for producing a signal varying in magnitude as the amplitude of the A.-C. signal appearing across said parallel-connected elements, and transistor means responsive to said rectifier signal for producing said D.-C. excitation current varying in magnitude as a function of said rectifier signal.

5. A force-to-current transducer comprising, in combination, a fulcrumed lever balanced by application thereto of a condition-responsive input force and an electromagnetic counterforce, an electromagnetic means coupled with said lever and energized by a D.-C. excitation current for producing said counterforce, means for producing said excitation current including, a transistor oscillator having a temperature compensating circuit and operating at a relatively high frequency, inductive and capacitive elements connected in parallel and energized by said oscillator, means for varying the inductance of said inductive element in response to movement of said lever so that the impedance of said parallel-connected elements increases as said lever moves in the direction of said input force, rectifier means coupled to said elements for producing a signal varying in magnitude as the amplitude of the A.-C. signal appearing across said parallel-connected elements, and transistor means having a temperature compensating circuit and responsive to said rectifier signal for producing said D.-C. excitation current varying in magnitude as a function of said rectifier signal.

6. A force-to-current transducer comprising, in combination, a fulcrumed lever balanced by application thereto of a condition-responsive input force and an electromagnetic counterforce, an electromagnetic means coupled with said lever and energized by a D.-C. excitation current for producing said counterforce, means for producing said excitation current including, a source of relatively high frequency A.-C. voltage, inductive and capacitive elements connected in parallel and energized by said source, means for varying the reactance of one of said elements in response to movement of said lever so that the resonant frequency of said parallel-connected elements is varied relative to the frequency of said source, rectifier means coupled to said elements for producing a signal varying in magnitude as the amplitude of the A.-C. signal appearing across said parallel connected elements, and amplifier means responsive to said D.-C. signal for producing said D.-C. excitation current.

References Cited in the file of this patent

UNITED STATES PATENTS

| | | |
|---|---|---|
| 2,407,141 | Coake | Sept. 3, 1946 |
| 2,847,625 | Popowsky | Aug. 12, 1958 |
| 2,925,544 | Lang | Feb. 16, 1960 |
| 2,932,817 | Kershaw | Apr. 12, 1960 |
| 2,949,273 | Roper | Aug. 16, 1960 |
| 2,968,753 | Mesh | Jan. 17, 1961 |

OTHER REFERENCES

R. Kretzmann: Industrial Electronics Handbook, Phillips Technical Library, 1958; pages 290–291, Fig. 21–10.

UNITED STATES PATENT OFFICE
CERTIFICATE OF CORRECTION

Patent No. 3,102,217          August 27, 1963

Clark V. Bullen

It is hereby certified that error appears in the above numbered patent requiring correction and that the said Letters Patent should read as corrected below.

In the grant, lines 2 and 12, and in the heading to the printed specification, lines 4 and 5, name of assignee, for "Barber-Coleman Company", each occurrence, read -- Barber-Colman Company --.

Signed and sealed this 7th day of April 1964.

(SEAL)
Attest:

ERNEST W. SWIDER

Attesting Officer

EDWARD J. BRENNER

Commissioner of Patents